United States Patent Office 3,041,315
Patented June 26, 1962

3,041,315
POLYMERS OF MONOVINYL COMPOUNDS WITH MALEIC ACID HALF-ESTERS AND MALEIC ACID HALF-AMIDES
Hans Gerlich and Horst Erich Knobloch, Ludwigshafen (Rhine), and Ferdinand Meyer, Ziegelhausen (Neckar), Germany, assignors to Badische Anilin- & Soda-Fabrik Aktiengesellschaft, Ludwigshafen (Rhine), Germany
No Drawing. Filed June 30, 1959, Ser. No. 823,837
Claims priority, application Germany July 10, 1958
6 Claims. (Cl. 260—78)

This invention relates to film-forming polymers which are soluble in ethanol, and more particularly to polymers of a monovinyl compound with maleic acid half-esters and maleic acid half-amides.

Copolymers derived from half-esters or half-amides of maleic acid and other vinyl compounds are already known. These copolymers have, however, poor solubility in ethanol. Copolymers which have been prepared from vinyl compounds and the half-esters of maleic acid are not compatible with tannin and are also not compatible with metals and therefore cannot be used as label varnish or as lacquers for offset printing. Copolymers which have been built up from vinyl compounds and the half-amides of maleic acid have low softening points and a dark color. Accordingly, very little interest has been shown in such copolymers, especially for use as lacquers, coatings or the like.

One object of the present invention is to provide new and improved copolymers having a high degree of utility in film-forming compositions. Other objects and advantages are set forth hereinafter.

We have now found in accordance with the invention that spirit-soluble lacquer resins on the basis of copolymers of monovinyl compounds and derivatives of maleic acid are obtained by using as the derivative of maleic acid a mixture of about equal proportions of a maleic acid half-ester and a maleic acid half-amide.

The most suitable vinyl compounds are styrene and its substitution products, such as alpha-methylstyrene, vinyltoluene or halogenated styrenes or alkylstyrenes. There may also be used vinyl esters of lower fatty acids which contain 2 to 4 carbon atoms in the acid radical, as for example vinyl acetate or vinyl propionate or vinyl esters of inorganic acids, as for example vinyl chloride, vinyl sulfonic acid or vinyl phosphoric acid. Vinyl ethers of alkyl and cycloalkyl monohydric alcohols which contain about 1 to 8 carbon atoms in the alcohol component, as for example vinyl ethyl ether, vinyl butyl ether or vinyl cyclohexyl ether, are also suitable. Other vinyl compounds are acrylic acid compounds, as for example acrylic acid esters of alkyl or cycloalkyl monohydric alcohols which contain 1 to 8 carbon atoms in the alcohol component, or acrylonitrile. Also, mixtures of the said vinyl compounds, may be copolymerized with the maleic acid half-esters and maleic acid half-amides.

The maleic acid half-esters, which are obtained in known manner by reaction of maleic anhydride with the corresponding amounts of alcohol, may contain as alcoholic components alkanols or cycloalkanols or aromatic alcohols which contain up to about 15 carbon atoms and may be linear or branched. Alcohols of this kind are for example methanol, ethanol, propanol, butanol, isobutanol, ethylhexanol, cyclohexanol or benzyl alcohol.

The maletic acid half-amides are obtained, analogously to the maleic acid half-esters, by reaction of maleic anhydride with the corresponding amines. Suitable amines are aliphatic, cycloaliphatic, aromatic or heterocyclic amines which may contain up to 16 carbon atoms, preferably those having one nitrogen atom with a single reactive hydrogen atom. Examples of such amines are the lower dialkylamines such as dibutylamine, diisobutylamine, diethylamine and dipropylamine and cyclic alkyl amines such as cyclic hexamethylamine, pyrrolidine or piperidine.

The monovinyl compounds are copolymerized with a mixture of maleic acid half-esters and half-amides. It is also possible, however, first to copolymerize maleic anhydride with a monovinyl compound and then to react the copolymer with the appropriate amounts of alcohols and amines.

The copolymerization may be carried out in known manner in bulk, in emulsion, in solution or also in suspension. As polymerization catalysts there may be used the known radical-forming catalysts, as for example azo compounds, such as azoisobutyronitrile, or per compounds, such as peroxides or persulfates, as for example hydrogen peroxide, benzoyl peroxide or alkali persulfates. It is especially advantageous to carry out the polymerization in solution, the solvent used being an organic solvent which is inert under the reaction conditions, as for example a hydrocarbon such as benzene, toluene or xylene. It is also possible to carry out the polymerization in spirit (ethanol), so that a spirit solution of a lacquer resin is obtained which may be further used directly or after the addition of further spirit.

The copolymer should contain about 30 to 50% by weight, preferably 35 to 40% by weight, of maleic acid derivatives, i.e. both esters and amides, with reference to the total weight of the polymer.

The relative proportions of half-ester and half-amide of maleic acid may vary only within certain limits. Copolymers are especially advantageous in which 0.6 to 0.4 mol of amine and 0.4 to 0.6 mol of alcohol are contained per mol of maleic acid. In other words, the molar ratio of the maleic acid half-ester to the maleic acid half-amide in the copolymer should fall within a range of 0.6:0.4 to 0.4:0.6. These mixtures, which are copolymerized with vinyl compounds, or are obtained subsequently by reaction of a copolymer of maleic anhydride and a vinyl compound with amines and alcohols, exhibit a specially low viscosity and the sprit solutions of these copolymers dry rapidly. These resins have a considerably higher softening point than resins in which only maleic acid amide or half-amide has been used, but have a lower softening point than copolymers in which only maleic acid ester or half-ester has been used. The softening point and also the viscosity rise with increase in the content of maleic acid half-ester in the copolymer. A resin derived from the maleic acid half-amide of dibutylamine and styrene is still viscous and the viscosity of a 50% solution of this resin in spirit is 20 seconds in a Ford beaker No. 4 at room temperature. A resin which has been obtained by copolymerization of styrene with the monoethyl ester of maleic acid on the other hand has a softening point of above 140° C. and a viscosity of 135 seconds measured in a 50% spirit solution of the resin.

The copolymers prepared from vinyl compounds and maleic half-amides and half-esters according to the present invention have only very short drying times and softening points which lie above 80° C., with a viscosity lying between 40 and 70 seconds measured in a 50% spirit solution at room temperature in a Ford beaker No. 4.

The lacquer resins obtained are compatible in use with shellac or Manila copals. As compared with these natural resins, however, they have greater transparency and also a better resistance to water. The resins may be used as rapid drying-non-yellowing spirit solutions; they are compatible with tanning and inert to metals. They hay therefore be used especially advantageously as label varnishes and in offset printing.

The following examples will further illustrate this invention is not restricted to these examples. The parts specified in the examples are parts by weight.

*Example 1*

221 parts of maleic anhydride are dissolved at 60° C. in 52 parts of ethanol and added at this temperature during the course of 120 minutes while stirring vigorously to 146 parts of dibutylamine. After adding 135 parts of styrene, 327 parts of benzene and 19 parts of benzoyl peroxide, the solution is polymerized for 12 hours at 75° C. while stirring. The solvent is then distilled off. 660 parts of a resin with a softening point of 92° C. and an acid number of 180 are obtained. The solubility of the resin in spirit is unlimited. The viscosity of a 50% solution is 42 seconds in Ford beaker No. 4. The copolymer is compatible with tannin and can be used as a lacquer, while copolymers of maleic half-amides or maleic half-esters with styrene are incompatible with tannin.

*Example 2*

210 parts of maleic anhydride, 64 parts of butanol and 166 parts of dibutylamine are reacted as in Example 1 and polymerized with 223 parts of styrene, 317 parts of benzene and 20 parts of benzoyl peroxide for 12 hours at 75° C. After evaporating the benzene, 640 parts of a resin are obtained with a softening point of 75° C. and an acid number of 178. The resin has an unlimited solubility in spirit. The viscosity of the 50% spirit solution is 39 seconds in Ford beaker No. 4. The resin is compatible with tannin and can be used as a film-forming lacquer.

*Example 3*

202 parts of maleic anhydride, 125 parts of cyclohexanol and 108 parts of dibutylamine are reacted as in Example 1, and polymerized with 217 parts of styrene, 328 parts of benzene and 20 parts of benzoyl peroxide for 12 hours at 75° C. After evaporating the benzene, 690 parts of a resin are obtained with a softening point of 140° C. and an acid number of 185. The resin has unlimited solubility in spirit. The viscosity of the 50% solution in Ford beaker No. 4 is 50 seconds.

*Example 4*

246 parts of maleic anhydride, 46 parts of ethanol and 107 parts of pyrrolidine are reacted as in Example 1 and polymerized with 262 parts of styrene in 334 parts of benzene with the addition of 5 parts of benzoyl peroxide for 3 hours at 75° C. After evaporating the solvent, 630 parts of a resin are obtained with a softening point of 97° C. and an acid number of 212. The resin has an unlimited solubility in spirit. The viscosity of the 50% solution in Ford beaker No. 4 is 78 seconds. The resin is compatible with tannin.

*Example 5*

228 parts of maleic anhydride, 93.5 parts of cyclohexanol and 99.5 parts of pyrrolidine are reacted as in Example 1 and polymerized with 242 parts of styrene and 331 parts of benzene with the addition of 6 parts of benzoyl peroxide for 3 hours at 75° C. After evaporating the benzene, 660 parts of a resin are obtained with a softening point of 111° C. and an acid number of 186. The resin has unlimited solubility in spirit. The viscosity of the 50% solution in Ford beaker No. 4 is 87 seconds.

*Example 6*

229 parts of maleic anhydride, 43 parts of ethanol and 143 parts of hexamethylene imine are reacted as in Example 1 and polymerized for 24 hours at 75° C. with 243 parts of styrene and 326 parts of benzene with the addition of 16 parts of benzoyl peroxide. After evaporating the benzene, 650 parts of a resin are obtained with a softening point of 110° C. and an acid value of 198. The resin has an unlimited solubility in spirit. The viscosity of the 50% solution in Ford beaker No. 4 is 60 seconds.

*Example 7*

208 parts of maleic anhydride, 106 parts of cyclohexanol and 120 parts of N-methylcyclohexylamine are reacted as in Example 1 and polymerized for 24 hours at 75° C. with 220 parts of styrene and 326 parts of benzene with the addition of 20 parts of benzoyl peroxide. After evaporating the benzene, 640 parts of a resin are obtained with a softening point of 84° C. and an acid number of 184. The viscosity of a 50% solution in Ford beaker No. 4 is 25 seconds. The resin is compatible with tannin.

*Example 8*

225 parts of maleic anhydride, 42.5 parts of ethanol and 148 parts of mono-N-methylaniline are reacted as in Example 1 and polymerized for 24 hours at 75° C. with 239 parts of styrene and 333 parts of benzene with the addition of 12.5 parts of benzoyl peroxide. After evaporating the benzene, 520 parts of a resin are obtained with a softening point of 65° C. The viscosity of a 50% solution in Ford beaker No. 4 is 50 seconds. The resin is compatible with tannin.

*Example 9*

A mixture of 98 parts of maleic anhydride, 104 parts of styrene, 1,000 parts of xylene and 4 parts of benzoyl peroxide is slowly heated under reflux while stirring. The polymerization commences at about 80° C. With separation of the styrene-maleic anhydride copolymer, the temperature of the mixture rises to the boiling point of the styrene. When the reaction has ceased there are added first 25.8 parts of dibutylamine and then 36.8 parts of ethanol and the mixture stirred for about another 4 hours at 80° C. After evaporating the xylene in vacuo, a pale yellow clear resin is obtained; it has unlimited solubility in spirit and has a softening point of 85° C. The resin has the acid number 195. The viscosity of a 50% solution of the resin in spirit is 60 seconds in Ford beaker No. 4. The resin is compatible with tannin and suitable for the production of offset prints.

*Example 10*

210 parts of maleic anhydride, 64 parts of butanol and 166 parts of dibutylamine are reacted as in Example 1 and the reaction product polymerized with 140 parts of vinyl ethyl ether and 300 parts of benzene with the addition of 10 parts of benzoyl peroxide for 12 hours at 75° C. The benzene is then evaporated in vacuo. A resin is obtained which has an unlimited solubility in spirit.

Maleic anhydride may also first be copolymerized with vinyl ethyl ether in the presence of benzoyl peroxide and the copolymer then converted with dibutylamine and butanol into the corresponding half-amide and half-ester.

Spirit-soluble copolymers may also be obtained by using 170 parts of vinyl acetate or 110 parts of vinyl chloride instead of 140 parts of vinyl ethyl ether.

What we claim is:

1. An ethanol-soluble film-forming polymer of (A) 50 to 70% by weight of a polymerized monovinyl compound selected from the group consisting of styrene, alkyl-styrenes, vinyl esters of fatty acids which contain 2 to 4 carbon atoms in the acid radical, vinyl esters of inorganic acids, vinyl esters of alkyl and cycloalkyl monohydric alcohols containing 1 to 8 carbon atoms in the alcohol component, acrylic acid esters of alkyl and cycloalkyl monohydric alcohols containing 1 to 8 carbon atoms in the alcohol component and mixtures thereof, and (B) 30 to 50% by weight of polymerized maleic acid half-esters and half-amides in which the alcohol component of the half-ester contains up to 15 carbon atoms and is selected from the group consisting of alkanols, cycloalkanols and benzyl alcohol and in which the amine component in the half-amide has one nitrogen atom with a single reactive hydrogen atom and contains up to 16 carbon atoms, the molar ratio of said maleic acid half-ester to said maleic acid half-amide being in the range of 0.6:0.4 to 0.4:0.6.

2. An ethanol-soluble film-forming polymer of (A) 50 to 70% by weight of polymerized styrene and (B) 30 to 50% by weight of polymerized maleic acid half-esters and half-amides in which the alcohol component in the half-ester contains up to 15 carbon atoms and is selected from the group consisting of alkanols, cycloalkanols and benzyl alcohol and in which the amine component in the half-amide has one nitrogen atom with a single reactive hydrogen atom and contains up to 16 carbon atoms, the molar ratio of said maleic acid half-ester to said maleic acid half-amide being in the range of 0.6:0.4 to 0.4:0.6.

3. An ethanol-soluble film-forming polymer of (A) 50 to 70% by weight of polymerized styrene and (B) 30 to 50% by weight of the polymerized maleic acid half-ester of ethanol and the polymerized maleic acid half-amide of dibutylamine, the molar ratio of said maleic acid half-ester of ethanol to said maleic acid half-amide of dibutylamine being in the range of 0.6:0.4 to 0.4:0.6.

4. An ethanol-soluble film-forming polymer of (A) 50 to 70% by weight of polymerized styrene and (B) 30 to 50% by weight of the polymerized maleic acid half-ester of butanol and the polymerized maleic acid half-amide of dibutylamine, the molar ratio of said maleic acid half-ester of butanol to said maleic acid half-amide of dibutylamine being in the range of 0.6:0.4 to 0.4:0.6.

5. An ethanol-soluble film-forming polymer of (A) 50 to 70% by weight of polymerized styrene and (B) 30 to 50% by weight of the polymerized maleic acid half-ester of cyclohexanol and the polymerized maleic acid half-amide of dibutylamine, the molar ratio of said maleic acid half-ester of cyclohexanol to said maleic acid half-amide of dibutylamine being in the range of 0.6:0.4 to 0.4:0.6.

6. A process for the production of film-forming polymers which comprises: polymerizing, by heating in the presence of a polymerization catalyst until a film-forming polymer is obtained which is soluble in ethanol, (A) 50 to 70% by weight of a monovinyl compound selected from the group consisting of styrene, alkylstyrenes, vinyl esters of fatty acids which contain 2 to 4 carbon atoms in the acid radical, vinyl esters of inorganic acids, vinyl esters of alkyl and cycloalkyl monohydric alcohols containing 1 to 8 carbon atoms in the alcohol component, acrylic acid esters of alkyl and cycloalkyl monohydric alcohols containing 1 to 8 carbon atoms in the alcohol component, and (B) 30 to 50% by weight of maleic acid, said maleic acid being reacted with an alcohol and amine to form a corresponding ester and amide, respectively, with carboxylic acid groups in said maleic acid, the total mols of said alcohol and amine being about equal to the number of mols of said maleic acid and the molar ratio of said alcohol to said amine falling in the range of 0.6:0.4 to 0.4:0.6, said alcohol containing up to 15 carbon atoms and being selected from the group consisting of alkanols, cycloalkanols and benzyl alcohol and said amine containing one nitrogen atom with a single reactive hydrogen atom in a hydrocarbon structure of up to 16 carbon atoms.

References Cited in the file of this patent
UNITED STATES PATENTS

| | | |
|---|---|---|
| 2,486,370 | Kenyon et al. | Oct. 25, 1949 |
| 2,615,845 | Lippincott et al. | Oct. 28, 1952 |
| 2,699,437 | D'Alelio | Jan. 11, 1955 |
| 2,712,003 | Bowen | June 28, 1955 |
| 2,912,399 | Barte | Nov. 10, 1959 |

UNITED STATES PATENT OFFICE
CERTIFICATE OF CORRECTION

Patent No. 3,041,315                      June 26, 1962

Hans Gerlich et al.

It is hereby certified that error appears in the above numbered patent requiring correction and that the said Letters Patent should read as corrected below.

Column 2, line 69, for "hay" read -- may --; column 6, line 34, for "Barte" read -- Bartl --.

Signed and sealed this 23rd day of October 1962.

(SEAL)
Attest:

ERNEST W. SWIDER
Attesting Officer

DAVID L. LADD
Commissioner of Patents